US011942675B2

(12) United States Patent
Mori

(10) Patent No.: US 11,942,675 B2
(45) Date of Patent: Mar. 26, 2024

(54) WIRELESS COMMUNICATION DEVICE

(71) Applicant: BROTHER KOGYO KABUSHIKI KAISHA, Nagoya (JP)

(72) Inventor: Takato Mori, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 45 days.

(21) Appl. No.: 17/681,599

(22) Filed: Feb. 25, 2022

(65) Prior Publication Data

US 2022/0278437 A1 Sep. 1, 2022

(30) Foreign Application Priority Data

Feb. 26, 2021 (JP) ................................ 2021-031130

(51) Int. Cl.

*H01Q 1/22* (2006.01)
*H01Q 1/38* (2006.01)
*H01Q 1/42* (2006.01)

(52) U.S. Cl.

CPC ............. *H01Q 1/2291* (2013.01); *H01Q 1/38* (2013.01); *H01Q 1/422* (2013.01)

(58) Field of Classification Search

CPC ........ H01Q 1/2291; H01Q 1/38; H01Q 1/422; H01Q 1/40

See application file for complete search history.

(56) References Cited

U.S. PATENT DOCUMENTS

| | | | | |
|---|---|---|---|---|
| 2020/0412017 | A1* | 12/2020 | Park | H01Q 1/526 |
| 2021/0136243 | A1 | 5/2021 | Wada | |

FOREIGN PATENT DOCUMENTS

| | | | |
|---|---|---|---|
| JP | 2013-230567 | A | 11/2013 |
| JP | 2016-139697 | A | 8/2016 |
| JP | 2018-158446 | A | 10/2018 |
| JP | 2021-70263 | A | 5/2021 |

* cited by examiner

*Primary Examiner* — David E Lotter
(74) *Attorney, Agent, or Firm* — KENEALY VAIDYA LLP

(57) ABSTRACT

A wireless communication device includes a main substrate, a wireless communication substrate having an antenna configured to perform wireless communication, a sub-substrate having a first substrate surface and a second substrate surface opposite to the first substrate surface, a main connector provided on the main substrate, a communication connector provided on the wireless communication substrate, a first connector provided on the sub-substrate and being electrically connected to the main connector such that the sub-substrate is parallel to the main substrate, and a second connector provided on the sub-substrate and being electrically connected to the communication connector such that the sub-substrate is parallel to the main substrate, in which a position of the first connector and a position of the second connector are shifted, seen from a direction orthogonal to the first substrate surface of the sub-substrate.

11 Claims, 10 Drawing Sheets

WIRELESS COMMUNICATION DEVICE

CROSS-REFERENCE TO RELATED APPLICATIONS

This application is based on and claims priority under 35 USC 119 from Japanese Patent Application No. 2021-031130 filed on Feb. 26, 2021, the contents of which are incorporated herein by reference.

TECHNICAL FIELD

The present disclosure relates to a wireless communication device.

BACKGROUND

In an image forming apparatus of a related art, an antenna unit on a wireless communication substrate is arranged in a position facing a space above a loading part so that radio waves transmitted and received by the antenna unit on the wireless communication substrate are not blocked by a side plate of metal.

SUMMARY

A first illustrative aspect of the present disclosure provides a wireless communication device including a main substrate, a wireless communication substrate, a sub-substrate, a main connector, a communication connector, a first connector, and a second connector. The wireless communication substrate has an antenna configured to perform wireless communication. The sub-substrate has a first substrate surface and a second substrate surface opposite to the first substrate surface. The main connector is provided on the main substrate. The communication connector is provided on the wireless communication substrate. The first connector is provided on the sub-substrate and is electrically connected to the main connector such that the sub-substrate is parallel to the main substrate. The second connector is provided on the sub-substrate and is electrically connected to the communication connector such that the sub-substrate is parallel to the main substrate. A position of the first connector and a position of the second connector are shifted, seen from a direction orthogonal to the first substrate surface of the sub-substrate.

In the above-described configuration, the first connector is configured to connect with the main connector provided on the main substrate, and the second connector is configured to connect with the communication connector provided on the wireless communication substrate. By connecting the main connector provided on the main substrate and the first connector and connecting the communication connector provided on the wireless communication substrate and the second connector, the main substrate and the wireless communication substrate are connected via the sub-substrate. In a case where the main substrate and the wireless communication substrate are connected, a position of the antenna on the wireless communication substrate is determined, seen from the direction orthogonal to the first substrate surface of the sub-substrate.

Here, the main connector provided on the main substrate and the communication connector provided on the wireless communication substrate are enabled to be directly connected. In this case, the two connectors are directly connected each other without passing through the sub-substrate. In a case where the main substrate and the wireless communication substrate are connected, the position of the antenna on the wireless communication substrate is determined, seen from the direction orthogonal to the first substrate surface of the sub-substrate.

In the above-described configuration, the position of the first connector and the position of the second connector provided on the sub-substrate are shifted. Therefore, in the above-described configuration, the position of the antenna on the wireless communication substrate is shifted from the position of the antenna in the case where the two connectors are directly connected each other without passing through the sub-substrate. Therefore, according to the above-described configuration, it is possible to implement the wireless communication device capable of easily shifting the position of the antenna.

BRIEF DESCRIPTION OF IRE DRAWINGS

Aspects of the disclosure are illustrated by way of example and not by limitation in the accompanying figures in which like reference characters indicate similar elements.

DETAILED DESCRIPTION

When mounting the wireless communication substrate on a wireless communication device, it is necessary to arrange the antenna in a position around which there is no metal component, like the image forming apparatus of the related art. However, in a case where the antenna is arranged in the position around which there is no metal component in a state where a position of a main substrate in the wireless communication device is fixed, it is difficult to easily shift a position of the antenna.

One illustrative aspect of the present disclosure is to implement a wireless communication device capable of easily shifting a position of an antenna.

First Illustrative Embodiment

Hereinafter, a first illustrative embodiment of the present disclosure will be described in detail.

(Overall Configuration of Image Forming Apparatus)

Figure 1:
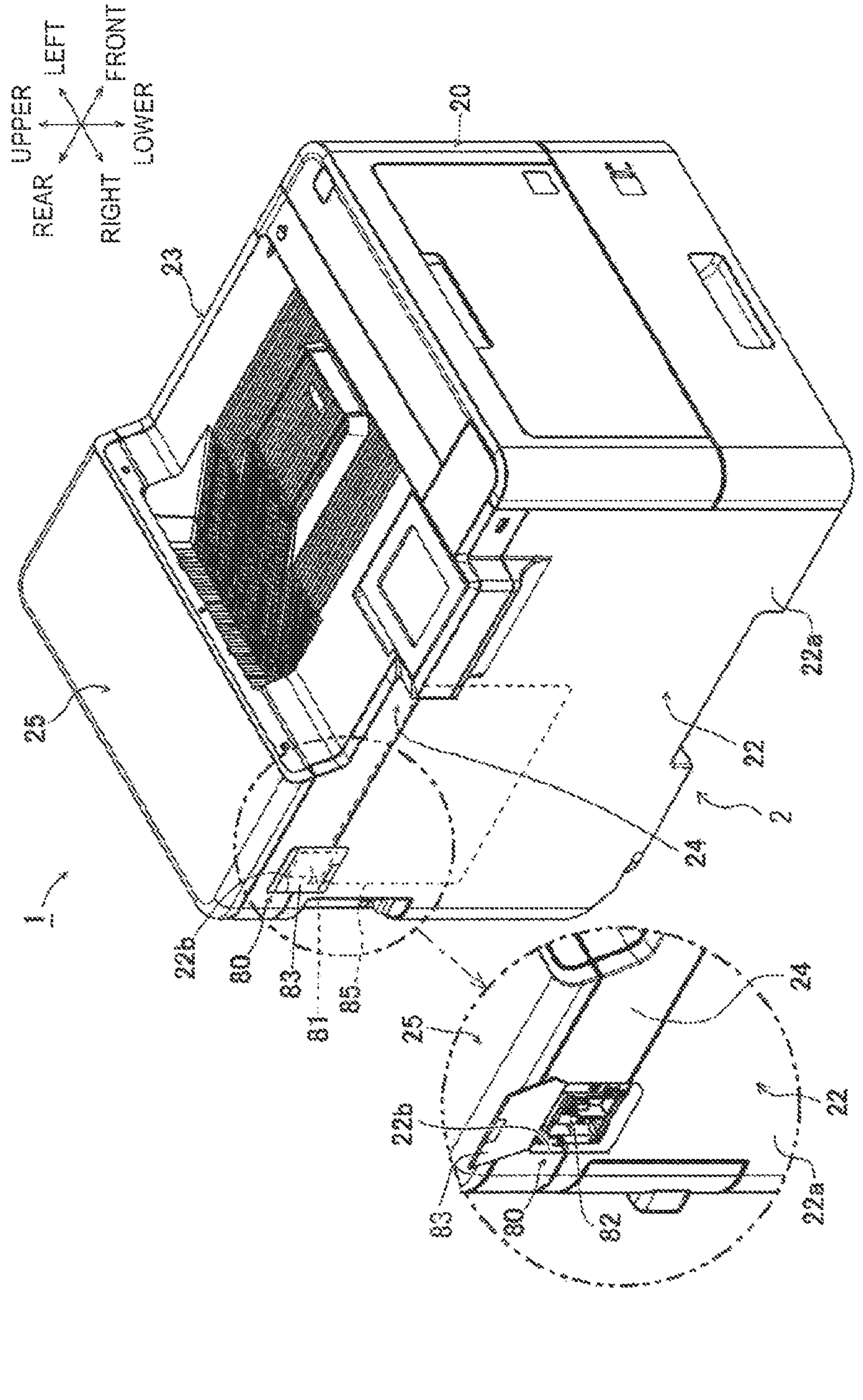
FIG. 1 is a perspective view showing an image forming apparatus according to a first illustrative embodiment of the present disclosure.
Figure 2:
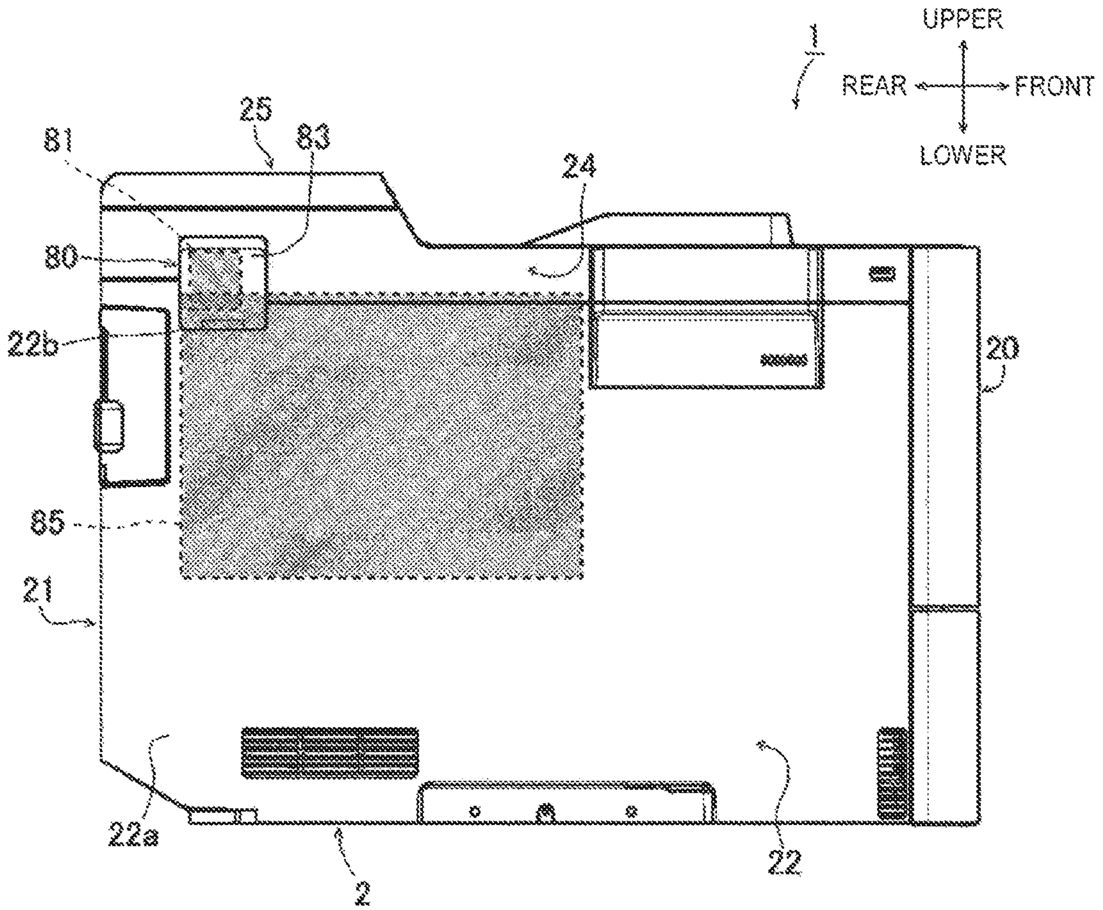
FIG. 2 is a right side view showing the image forming apparatus according to the first illustrative embodiment of the present disclosure.

FIG. 1 is a perspective view showing an image forming apparatus 1 according to the present illustrative embodiment. FIG. 2 is a right side view showing the image forming apparatus 1 according to the present illustrative embodiment. The image forming apparatus 1 is an example of the wireless communication device of the present disclosure.

In descriptions below, the right lower side of FIG. 1 is defined as the front side of the image forming apparatus 1, the left upper side of FIG. 1 is defined as the rear side of the image forming apparatus 1, the right upper side of FIG. 1 is defined as the left side of the image forming apparatus 1, and the left lower side of FIG. 1 is defined as the right side of the image forming apparatus 1. In addition, the upper side and the lower side of FIG. 1 are respectively defined as the upper side and the lower side of the image forming apparatus 1.

The image forming apparatus 1 has an apparatus body 2. The apparatus body 2 is a housing configured to accommodate a feeder unit, an image forming unit, a discharge part, a re-conveying unit, a motor and the like, which are not shown. As shown in FIGS. 1 and 2, the apparatus body 2 is configured by a front surface cover 20, a rear surface cover 21, a right side surface cover 22, a left side surface cover 23, an upper surface cover 24 and a top cover 25, (Wireless Communication Unit 80)

As shown in FIGS. 1 and 2, the image forming apparatus 1 includes a wireless communication unit 80 arranged on a side surface 22*a* of the right side surface cover 22. The wireless communication unit 80 is an example of the wireless communication means for enabling information to be input from an external terminal to the image forming apparatus 1 by wireless communication. The wireless communication unit 80 is a part configured to enable communication with an external terminal such as a smart phone by radio waves, and includes a wireless communication substrate 81 and a sub-substrate (not shown). The wireless communication substrate 81 shown in the present illustrative embodiment is a substrate configured to implement wireless communication by wireless LAN. The sub-substrate will be described later.

Figure 3:
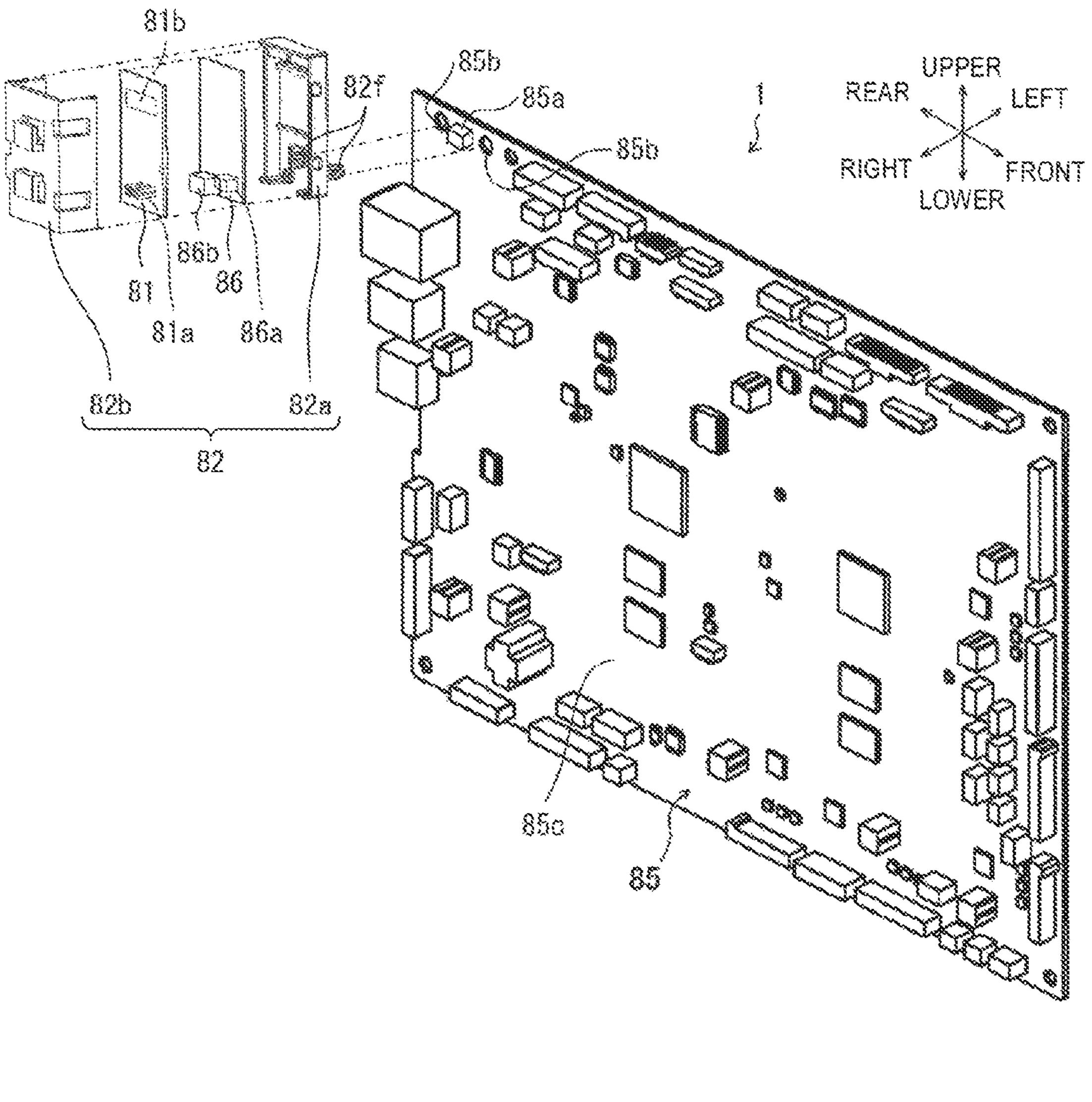
FIG. 3 is a perspective view showing an attached situation of a holder, a wireless communication substrate and a sub-substrate to a main substrate according to the first illustrative embodiment of the present disclosure.

FIG. 3 is a perspective view showing an attached situation of a holder 82, a wireless communication substrate 81 and a sub-substrate 86 to a main substrate 85. In other words. FIG. 3 is a perspective view showing a structure of the image forming apparatus 1. In the below, each substrate and the like of the image forming apparatus 1 are described.

As shown in FIG. 3, the image apparatus 1 includes a main substrate 85, the above-described wireless communication substrate 81, a sub-substrate 86, and a holder 82.

The main substrate 85 is a control substrate configured to control an operation of each unit of the image forming apparatus 1. The main substrate 85 is arranged on a backside of the right side surface cover 22. The wireless communication substrate 81 has an antenna configured to perform wireless communication. A plurality of elements is arranged on a substrate surface 85*c* of the main substrate 85.

The sub-substrate 86 is a substrate interposed between the main substrate 85 and the wireless communication substrate 81. The sub-substrate 86 is a substrate for converting a pin shape of a male terminal of a connector 81*a* on the wireless communication substrate 81 into a convex first connector 86*a* for fitting into a concave shape of a connector 85*a* on the main substrate 85. The wireless communication substrate 81 is connected to the sub-substrate 86.

The sub-substrate 86 is connected to the main substrate 85. The wireless communication substrate 81 and the main substrate 85 are connected via the sub-substrate 86.

The holder 82 is configured to cover the sub-substrate 86 and the wireless communication substrate 81, except the first connector 86*a* on the sub-substrate 86. In a state where the wireless communication substrate 81 and the sub-substrate 86 are held by the holder 82, the wireless communication substrate 81 and the sub-substrate 86 are attached to the main substrate 85. The first connector 86*a* on the sub-substrate 86 and the connector 85*a* on the main substrate 85 are connected.

The image forming apparatus 1 has an opening/closing cover 83 configured to close an opening portion 22*b* formed in the side surface 22*a* of the right side surface 22. The image forming apparatus 1 is configured so that a user can detach the holder 82 from the main substrate 85 in a state where the opening/closing cover 83 is opened. The shape of the first connector 86*a* on the sub-substrate 86 is a convex shape, not a pin shape. The connector 85*a* on the main substrate 85 has a concave shape. Therefore, the first connector 86*a* on the sub-substrate 86 can be easily fitted into the connector 85*a* on the main substrate 85, so that the user can easily attach and detach the holder 82 to and from the main substrate 85.

Note that, in the present illustrative embodiment, a case where the wireless communication substrate 81 on the wireless communication unit 80 is a substrate for wireless LAN (Local Area Network) is exemplified. However, the substrate that is used as the wireless communication substrate 81 may also be a substrate configured to implement wireless communication by other communication standards, and for example, may be a substrate for NFC (Near Field Communication), a substrate for Bluetooth (registered trademark), or the like.

(Wireless Communication Substrate 81)

As shown in FIG. 3, the wireless communication substrate 81 has a connector 81*a* and an antenna 81*b*. The connector 81*a* is a connector for connecting the wireless communication substrate 81 to a second connector 86*b* provided on the sub-substrate 86, and is configured to be detachably mounted to the sub-substrate 86. The antenna 81*b* is configured as an antenna element for transmitting radio waves from the wireless communication substrate 81 and receiving radio waves.

(Main Substrate 85)

As shown in FIG. 3, the main substrate 85 has a connector 85*a* and an opening portion 85*b*. The connector 85*a* is a connector for connecting the sub-substrate 86 to the main substrate 85. The opening portion 86*h* is a hole portion that is used so as to position the holder 82 with respect to the main substrate 85. A hole diameter of the opening portion 85*h* has such a size that is slightly larger than an outer shape of a protrusion 82*f* of the holder 82, and therefore, the protrusion 82*f* can be inserted.

(Holder 82)

As shown in FIG. 3, the holder 82 is configured by a first unit 82*a* and a second unit 82*b*. The first unit 82*a* and the second unit 82*b* are fitted to each other and integrated. More specifically, the main substrate 85 is mounted to the first unit 82*a*. The second unit 82*b* is fitted with the first unit 82*a* in a state where the wireless communication substrate 81 and the sub-substrate 86 are sandwiched between the second unit 82*h* and the first unit 82*a*.

Figure 4:
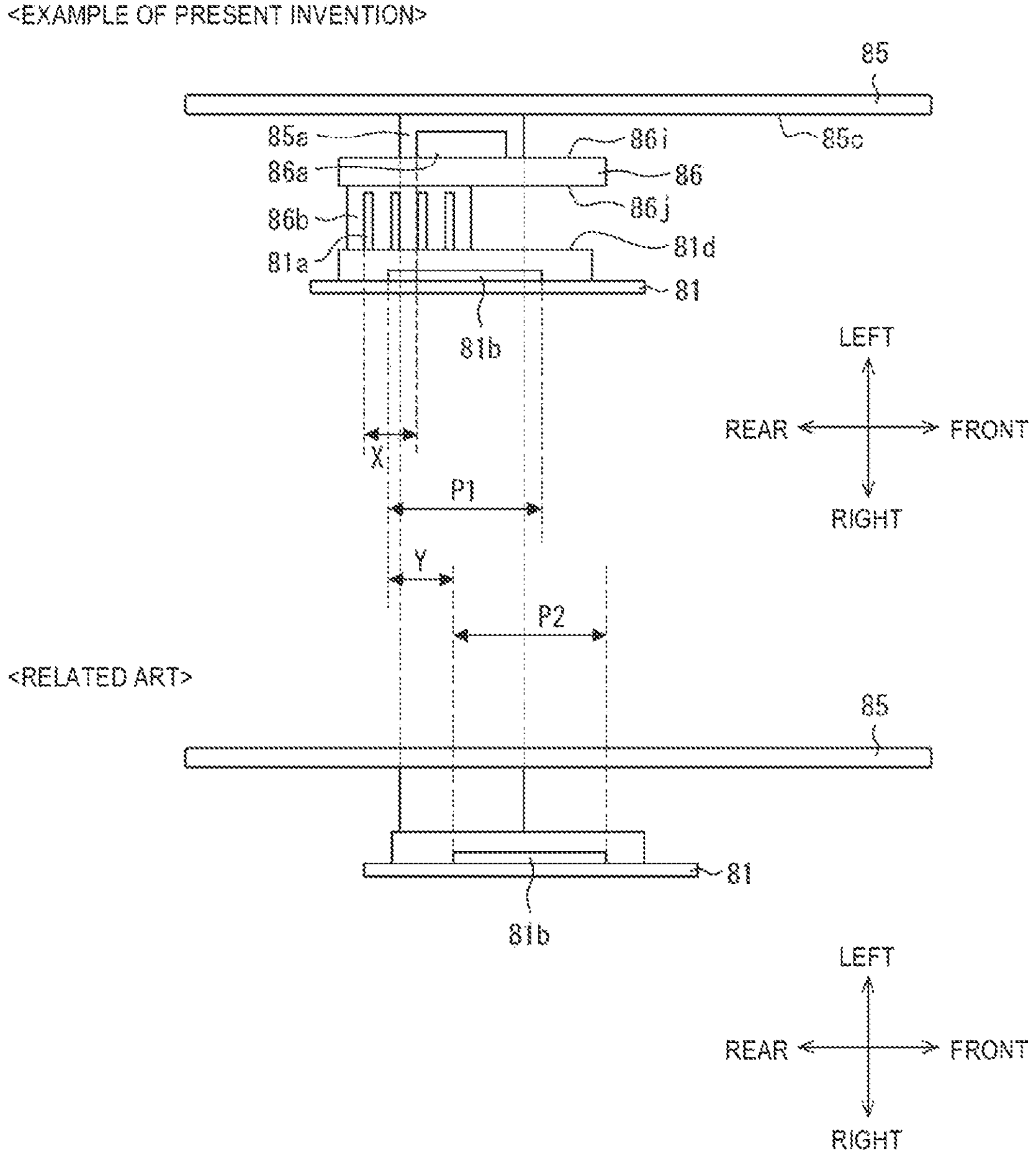
FIG. 4 is a side view showing a connection structure of the main substrate, the sub-substrate and the wireless communication substrate according to the first illustrative embodiment of the present disclosure, and is a side view showing a connection structure of the main substrate and the wireless communication substrate according to the related art.

The upper figure of FIG. 4 is a side view showing a connection structure of the main substrate 85, the sub-substrate 86 and the wireless communication substrate 81. The lower figure of FIG. 4 is a side view showing a connection structure of the main substrate 85 and the wireless communication substrate 81 of the related art. Note that, the connection structure shown in the lower figure of FIG. 4 is a connection structure of the two substrates in a case where the main substrate 85 and the wireless communication substrate 81 of the present illustrative embodiment can be directly connected.

Figure 5:
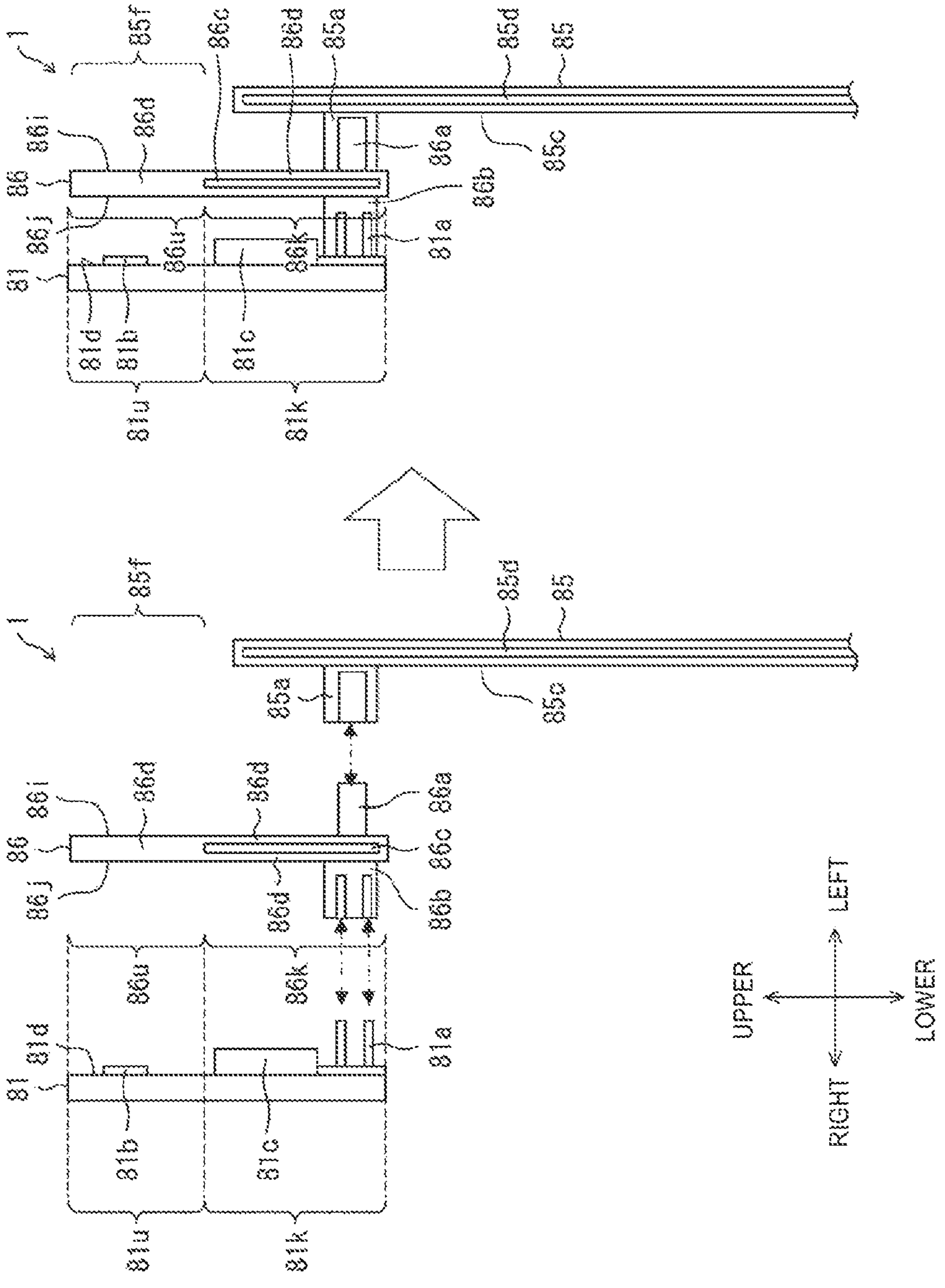
FIG. 5 is a cross-sectional view showing the connection structure of the main substrate, the sub-substrate and the wireless communication substrate according to the first illustrative embodiment of the present disclosure.

FIG. 5 is a cross-sectional view showing the connection structure of the main substrate 85, the sub-substrate 86 and the wireless communication substrate 81. The left figure of FIG. 5 shows a state where each substrate is not connected. The right figure of FIG. 5 shows a state where each substrate is connected.

As shown in the upper figure of FIG. 4 and FIG. 5, the connector 85*a* is provided on the substrate surface 85*c* of the main substrate 85. The first connector 86*a* is provided on a first substrate surface 86*i* of the sub-substrate 86, and the second connector 86*b* is provided on a second substrate surface 86*j* that is a back surface of the first substrate surface 86*i*. That is, as for the sub-substrate 86, the substrate surface on which the first connector 86*a* is provided and the substrate surface on which the second connector 86*h* is provided are different. The first connector 86*a* is an example of the first connector of the present disclosure. The second connector 86*b* is an example of the second connector of the present disclosure.

The first connector 86*a* is electrically connected to the connector 85*a* on the main substrate 85 so that the first substrate surface 86*i* of the sub-substrate 86 and the substrate surface 85*c* of the main substrate 85 are parallel. The second connector 86*h* is electrically connected to the connector 81*a* on the wireless communication substrate 81 so that the second substrate surface 86*j* of the sub-substrate 86 and a substrate surface 81*d* of the wireless communication substrate 81 are parallel. Note that, it is assumed that the term 'parallel' includes not only a case of being completely parallel but also a state close to parallel, for example, a state of deviating from a parallel plane by several degrees.

As shown in the upper figure of FIG. 4, in the image forming apparatus 1, a position of the first connector 86*a* and a position of the second connector 86*b* are shifted, seen from a direction orthogonal to the substrate surface 85*c* of the main substrate 85, i.e., from a right and left direction of the image forming apparatus 1. Note that, it is assumed that the term 'orthogonal' includes not only a case of being completely orthogonal but also a stale close to orthogonal, for example, a state of deviating from an orthogonal angle by several degrees.

More specifically, in the image forming apparatus 1, seen from the right and left direction of the image forming apparatus 1, the position of the first connector 86*a* is a position deviating from the position of the second connector 86*b* in a length direction of the main substrate 85, i.e., a position deviating by a deviation width X along a front and rear direction of the image forming apparatus 1.

Here, as shown in the upper figure of FIG. 4, in a case where the connector 85*a* on the main substrate 85 and the first connector 86*a* on the sub-substrate 86 are connected and the connector 81*a* on the wireless communication substrate 81 and the second connector 86*h* on the sub-substrate 86 are connected, the antenna 81*b* provided on the wireless communication substrate 81 is arranged in a position denoted with P1, seen from the right and left direction of the image forming apparatus 1.

On the other hand, as shown in the lower figure of FIG. 4, in a case where the connector 85*a* on the main substrate 85 and the connector 81*a* on the wireless communication substrate 81 are directly connected, the antenna 81*b* provided on the wireless communication substrate 81 is arranged in a position denoted with P2, seen from the right and left direction of the image forming apparatus 1.

As shown in the upper figure and the lower figure of FIG. 4, the position of the first connector 86*a* is shifted from the position of the second connector 86*b* by the deviation width X, so that the position P1 of the antenna 81*b* can be shifted from the position P2 of the antenna 81*b* by a deviation width Y. Note that, it is needless to say that the respective values of the deviation width X and the deviation width Y are the same.

Specifically, the position P1 of the antenna 81*b* in a case where the connector 81*a* on the wireless communication substrate 81 and the second connector 86*b* are connected can be shifted in the front and rear direction of the image forming apparatus 1 from the position P2 of the antenna 81*b* in a case where the connector 85*a* on the main substrate 85 and the connector 81*a* on the wireless communication substrate 81 are directly connected without passing through the sub-substrate 86.

In the below, the sub-substrate 86 is described in detail with reference also to FIG. 6.

Figure 6:
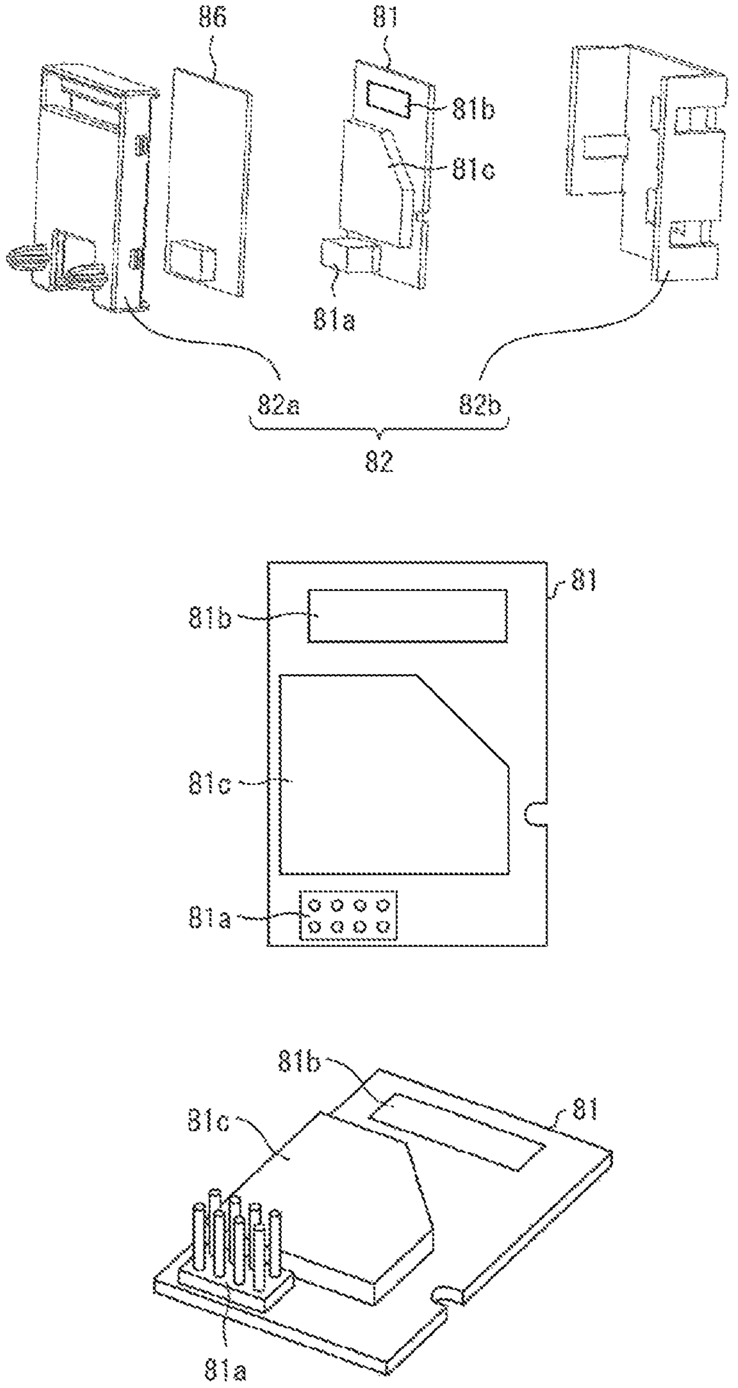
FIG. 6 shows the wireless communication substrate and components around there according to the first illustrative embodiment of the present disclosure.

FIG. 6 shows the wireless communication substrate 81 and components around there. The upper figure of FIG. 6 is a perspective view showing outer shapes of the first unit 82*a*, the sub-substrate 86, the wireless communication substrate 81 and the second unit 82*b*. The intermediate figure of FIG. 6 is a top view showing the outer shape of the wireless communication substrate 81. The lower figure of FIG. 6 is a perspective view showing the outer shape of the wireless communication substrate 81.

As shown in FIGS. 5 and 6, the connector 81*a*, the antenna 81*b* and a wireless communication module 81*c* are provided on the substrate surface 81*d* of the wireless communication substrate 81.

Here, as shown in FIG. 5, seen from the right and left direction of the image forming apparatus 1, the sub-substrate 86 is divided into a first area 86*k* in which a ground 86*c* is arranged inside an insulating layer 86*d*, and a second area 86*u* configured only by the insulating layer 86*d*, without the ground 86*c*. The insulating layer 86*d* is configured by an insulating member. The first area 86*k* is located on a downward side of the image forming apparatus 1. The second area 86*u* is located on an upward side of the image forming apparatus 1. Seen from the right and left direction of the image forming apparatus 1, the first area 86*k* overlaps an area 81*k* in which the connector 81*a* and the wireless communication module 81*c* are present on the wireless communication substrate 81. In addition, the second area 86*u* overlaps an area 81*u* in which the antenna 81*h* is present on the wireless communication substrate 81.

According to the above-described configuration, seen from the right and left direction of the image forming apparatus 1, the position of the antenna 81*b* on the wireless communication substrate 81 is included in the second area 86*u* in Which the ground 86*c* is not present on the sub-substrate 86. For this reason, the radio waves transmitted and received from the antenna 81*b* on the wireless communication substrate 81 are not inhibited by the ground 86*c* of the sub-substrate 86. Therefore, the wireless communication unit 80 can perform wireless communication by using the antenna 81*b*, without problem.

Note that, a part equivalent to the second area 86*u* of the sub-substrate 86 is held on the first unit 82*a* of the holder 82 shown in FIG. 3. However, it is not necessary to provide the part equivalent to the second area 86*u* of sub-substrate 86, in that it does not interfere with the transmission and reception of the radio waves from the antenna 81*b*. In this case, the holder 82 can support the sub-substrate 86 by holding a part equivalent to the first area 86*k* of the sub-substrate 86 by the first unit 82*a* of the holder 82.

In addition, according to the above-described configuration, seen from the right and left direction of the image forming apparatus 1, the position of the antenna 81*b* on the wireless communication substrate 81 is included in an area 85*f* in which the main substrate 85 is not present. For this reason, the radio waves transmitted and received from the antenna 81*b* on the wireless communication substrate 81 are not inhibited by a ground 85*d* of the main substrate 85. Therefore, the wireless communication unit 80 can perform wireless communication by using the antenna Sib, without problem.

As shown in FIG. 5, the first connector 86*a* on the sub-substrate 86 is configured by a convex male terminal. On the other hand, the connector 85*a* on the main substrate 85 is configured by a concave female terminal. The convex shape of the first connector 86*a* on the sub-substrate 86 and the concave shape of the connector 85*a* on the main substrate 85 are fitted, so that the sub-substrate 86 and the main substrate 85 are electrically connected. In addition, there may also be a support post configured to support the sub-substrate 86 and the main substrate 85 therebetween.

In addition, the second connector 86*h* on the sub-substrate 86 is configured by a female terminal having a hole. On the other hand, the connector 81*a* on the main substrate 81 is configured by a pin-shaped male terminal. The pin-shaped male terminal of the connector 81*a* on the wireless communication substrate 81 is inserted into the hole of the second connector 86*h* on the sub-substrate 86, so that the sub-substrate 86 and the wireless communication substrate 81 are electrically connected. Note that, it is needless to say that the number of the male terminals and the number of the holes of the female terminal are the same. In addition, there may also be a support post configured to support the sub-substrate 86 and the wireless communication substrate 81 therebetween.

Figure 7:
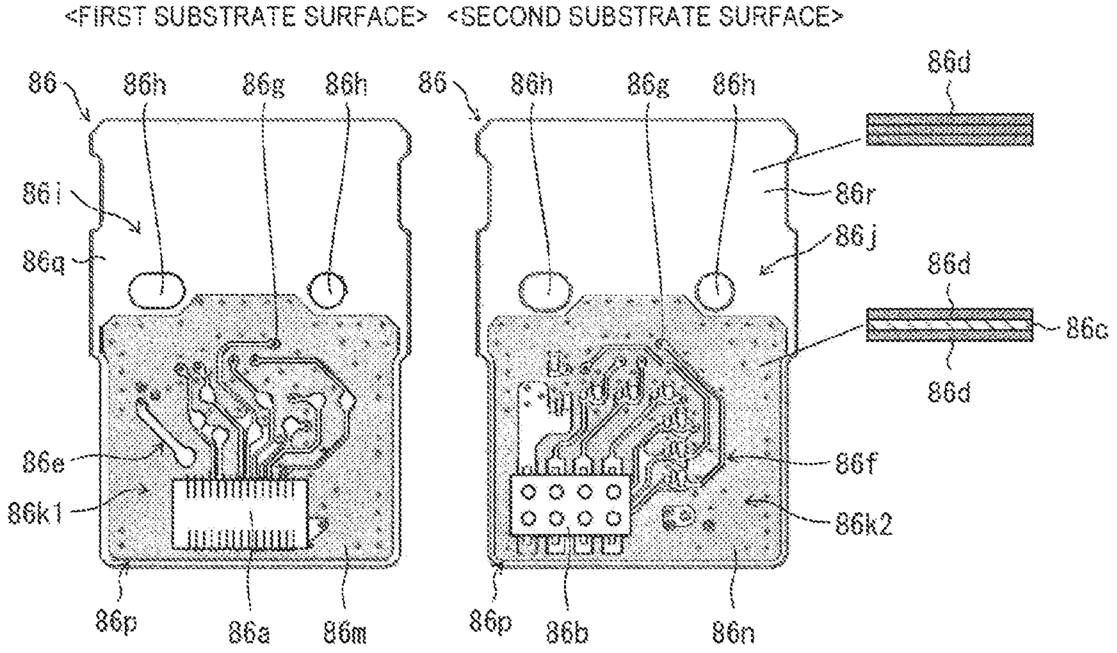
FIG. 7 is a plan view showing substrate surfaces of the sub-substrate according to the first illustrative embodiment of the present disclosure.

FIG. 7 is a plan view showing the first substrate surface 86*i* and the second substrate surface 86*j* of the sub-substrate 86. The first substrate surface 86*i* is a surface facing the substrate surface 85*c* of the main substrate 85 shown in FIG. 5. The second substrate surface 86*j* is a surface facing the substrate surface 81*d* of the wireless communication substrate 81 shown in FIG. 5. The left figure of FIG. 7 shows the first substrate surface 86*i*. The right figure of FIG. 7 shows the second substrate surface 86*j*.

The sub-substrate 86 includes a printed substrate 86*p* at a part. In a case where the sub-substrate 86 is seen from the first substrate surface 86*i* shown in the left figure of FIG. 7, the printed substrate 86 is divided into a hatching part 86*m* hatched and a non-hatching part 86*q* not hatched. The hatching part 86*m* has a multi-layered structure where the ground 86*c* made of metal is arranged in the insulating layer 86*d*. The hatching part 86*m* corresponds to the first area 86*k* shown in FIG. 5. On the other hand, the non-hatching part 86*q* has a single-layer structure configured only by the insulating layer 86*d*. The non-hatching part 86*q* corresponds to the second area 86*u* shown in FIGS.

A wiring pattern 86*e* is arranged on a first surface 86*k*1 of the hatching part 86*m*. The first connector 86*a* is provided on the first surface 86*k*1 and is electrically connected to the wiring pattern 86*e*.

On the other hand, in a case where the sub-substrate 86 is seen from the second substrate surface 86*j* shown in the right figure of FIG. 7, the printed substrate 86*p* is divided into a hatching part 86*n* hatched and a non-hatching part 86*r* not hatched. The hatching part 86*n* is a part equivalent to the hatching part 86*m* shown in the left figure of FIG. 7, in a case where the sub-substrate 86 is seen from the second substrate surface 86*j*. Similarly, the non-hatching part 86*r* is a part equivalent to the non-hatching part 86*q* shown in the left figure of FIG. 7, in a case where the sub-substrate 86 is seen from the second substrate surface 86*j*.

A wiring pattern 86*f* is arranged on a second surface 86*k*2 of the hatching part 86*n*. The second connector 86*b* is provided on the second surface 86*k*2 and is electrically connected to the wiring pattern 86*f*.

The printed substrate 86*p* is provided with a through-hole 86*g* penetrating through the printed substrate 86*p*. The wiring pattern 86*e* shown in the left figure of FIG. 7 and the wiring pattern 86*f* shown in the right figure of FIG. 6 are electrically connected via the through-hole 86*g*. The wiring pattern 86*e* and the wiring pattern 86*f* are electrically connected, so that the first connector 86*a* and the second connector 86*b* are electrically connected.

Note that, in a case where the sub-substrate 86 and the wireless communication substrate 81 are supported therebetween by using a support post, the support post is inserted into a through-hole 86*h* provided to the sub-substrate 86. Similarly, in a case where the sub-substrate 86 and the main substrate 85 are supported therebetween by using a support post, the support post is inserted into the through-hole 86*h* provided to the sub-substrate 86.

Second Illustrative Embodiment

In the below, a second illustrative embodiment of the present disclosure is described. Note that, for convenience of description, the members having the same functions as the members described in the first illustrative embodiment are denoted with the same reference signs, and the descriptions thereof are not repeated.

Figure 8:
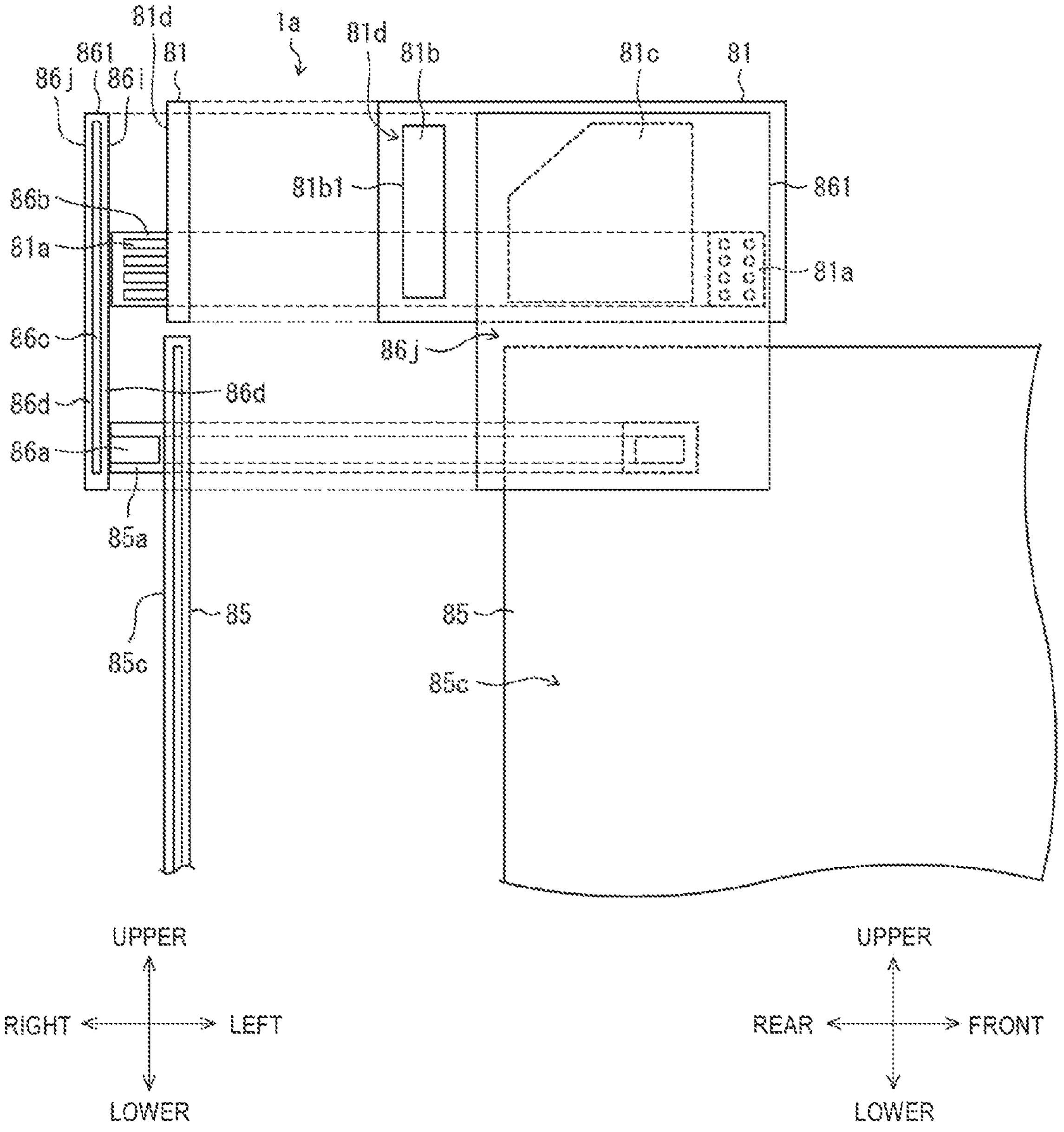
FIG. 8 shows a connection structure of the main substrate, a sub-substrate and the wireless communication substrate in an image fixing apparatus according to a second illustrative embodiment of the present disclosure.

FIG. 8 shows a connection structure of the main substrate 85, a sub-substrate 86*l* and the wireless communication substrate 81 in an image forming apparatus 1*a* according to a second illustrative embodiment of the present disclosure. The left figure of FIG. 8 is a cross-sectional view showing the connection structure. The right figure of FIG. 8 is a front view showing the connection structure.

As shown in FIG. 8, the first connector 86*a* that is electrically connected to the connector 85*a* on the main substrate 85 and the second connector 86*b* that is electrically connected to the connector 81*a* on the wireless communication substrate 81 are provided on the sub-substrate 86*l* of the image forming apparatus 1. In this case, the substrate surface 85*c* of the main substrate 85 and the substrate surface 81*d* of the wireless communication substrate 81 are all connected to face the first substrate surface 86*i* of the first sub-substrate 86*l*. In addition, the second connector 86*b* on the sub-substrate 86*l* and the connector 81*a* on the wireless communication substrate 81 are connected so that the wireless communication substrate 81 does not overlap the main substrate 85, seen from the direction orthogonal to the substrate surface 85*c* of the main substrate 85, i.e., from the right and left direction of the image forming apparatus 1*a*.

The antenna 81 has an antenna pattern 81*b*1 wired at an end portion in a length direction of the wireless communication substrate 81, along a width direction. The second connector 86*b* on the sub-substrate 86*l* and the connector 81*a* on the wireless communication substrate 81 are connected so that the length direction of the wireless communication substrate 81 is parallel to the length direction of the main substrate 85.

Note that, as for the sub-substrate 86*l* of the image forming apparatus 1*a*, the substrate surface on which the first connector 86*a* is provided and the substrate surface on which the second connector 86*b* is provided may be different. For example, the first connector 86*a* may be provided on the first substrate surface 86*i*, and the second connector 86*b* may be provided on the second substrate surface 86*j*. In addition, the reverse is also possible. In other words, in the left figure of FIG. 8, the second connector 86*b* may be provided on the second substrate surface 86*j*. In this case, the substrate surface to which the main substrate 85 is connected and the substrate surface to which the wireless communication substrate 81 is connected are different.

Note that, there may also be a support post configured to support the wireless communication substrate 81 and the sub-substrate 86*l* therebetween. In addition, as for arrangement of each substrate, the shape of the holder 82 of the present illustrative embodiment is required to be different from the first illustrative embodiment.

According to the above-described configuration, the wireless communication substrate 81 can be rotated by 90 degrees with respect to the main substrate 85, as compared to the first illustrative embodiment

Third Illustrative Embodiment

In the below, a third illustrative embodiment of the present disclosure is described. Note that, for convenience of description, the members having the same functions as the members described in the first and second illustrative embodiments are denoted with the same reference signs, and the descriptions thereof are not repeated.

Figure 9:
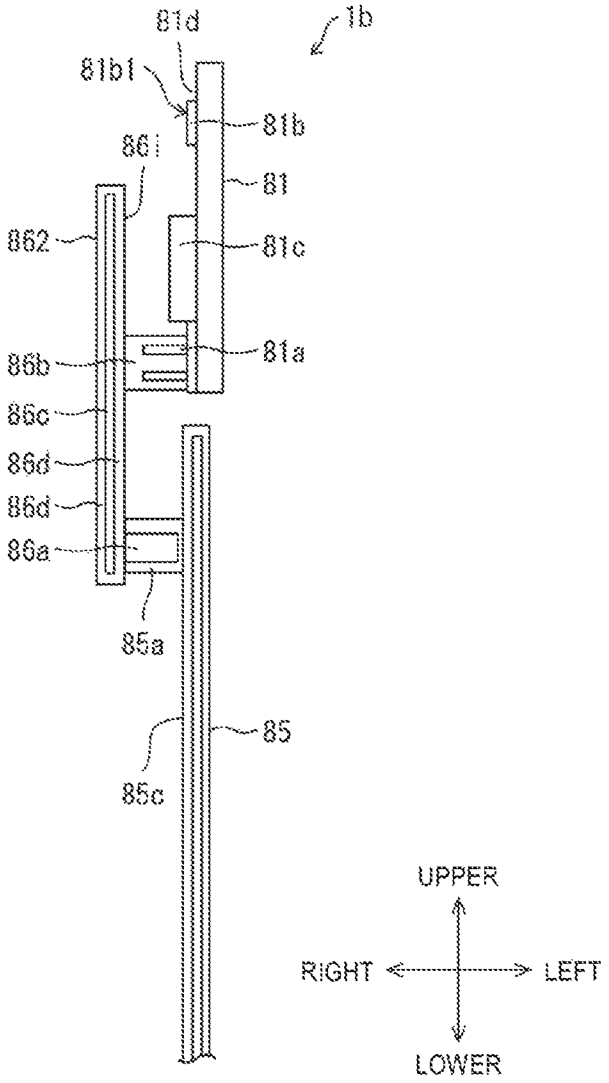
FIG. 9 shows a connection structure of the main substrate, a sub-substrate and the wireless communication substrate in an image forming apparatus according to a third illustrative embodiment of the present disclosure.

FIG. 9 shows a connection structure of the main substrate 85, a sub-substrate 862 and the wireless communication substrate 81 in an image forming apparatus 1*b* according to the present illustrative embodiment.

As shown in FIG. 9, the first connector 86*a* that is electrically connected to the connector 85*a* on the main substrate 85 and the second connector 86*b* that is electrically connected to the connector 81*a* on the wireless communication substrate 81 are provided on the first substrate surface 86*i* of the sub-substrate 862 of the image forming apparatus 1*b*. In addition, the second connector 86*b* on the sub-substrate 862 and the connector 81*a* on the wireless communication substrate 81 are connected so that the wireless communication substrate 81 does not overlap the main substrate 85, seen from the direction orthogonal to the first substrate surface 86*i* of the main substrate 85, i.e., from the right and left direction of the image forming apparatus 1*b*.

The antenna 81 has an antenna pattern 81*b*1 wired at an end portion in the length direction of the wireless communication substrate 81, along the width direction. In addition, the second connector 86*b* on the sub-substrate 862 and the connector 81*a* on the wireless communication substrate 81 are connected so that the width direction of the wireless communication substrate 81 is parallel to the length direction of the main substrate 85.

According to the above-described configuration, the antenna 81*b* on the wireless communication substrate 81 can be configured above the main substrate 85.

Fourth Illustrative Embodiment

In the below, a fourth illustrative embodiment of the present disclosure is described. Note that, for convenience of description, the members having the same functions as the members described in the first, second and third illustrative embodiments are denoted with the same reference signs, and the descriptions thereof are not repeated, FIG. 10 shows a connection structure of the main substrate 85, a sub-substrate 863 and the wireless communication substrate 81 in an image forming apparatus 1*c* according to the present illustrative embodiment.

Figure 10:
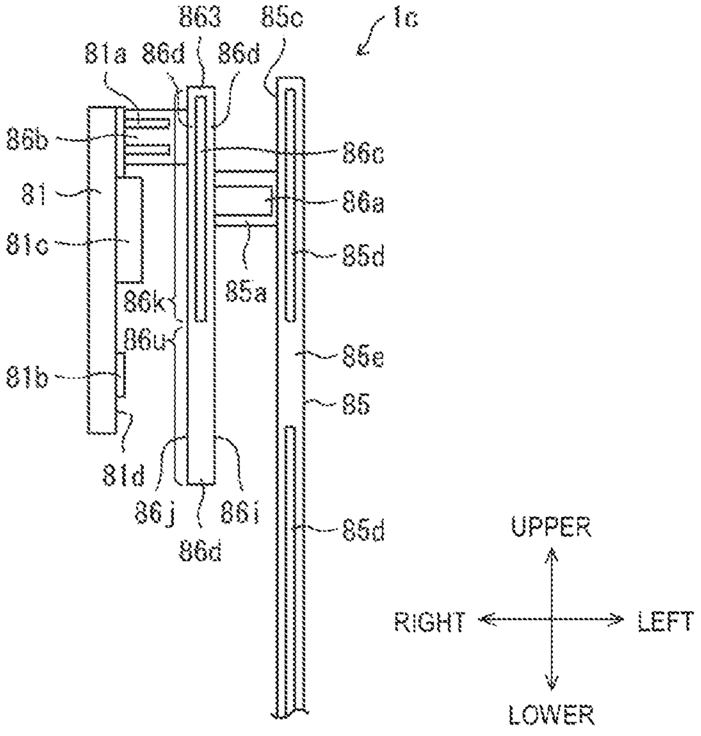
FIG. 10 shows a connection structure of the main substrate, a sub-substrate and the wireless communication substrate in an image forming apparatus according to a fourth illustrative embodiment of the present disclosure.

As shown in FIG. 10, the first connector 86*a* that is electrically connected to the connector 85*a* on the main substrate 85 is provided on the first substrate surface 86*i* of the sub-substrate 863 of the image forming apparatus 1*c*. On the other hand, the second connector 86*h* that is electrically connected to the connector 81*a* on the wireless communication substrate 81 is provided on the second substrate surface 86*j* of the sub-substrate 863.

The sub-substrate 863 is divided into the first area 86*k* in which the ground 86*c* is arranged inside the insulating layer 86*d*, and the second area 86*u* configured only by the insulating layer 86*d* without the ground 86*c*, seen from the right and left direction of the image forming apparatus 1*c*. The first area 86*k* is located on a downward side of the image forming apparatus 1*c*. The second area 86*u* is located on an upward side of the image forming apparatus 1*c*. Seen from the right and left direction the image forming apparatus 1*c*, the respective positions of the connector 81*a* and the wireless communication module 81*c* on the wireless communication substrate 81 are included in the first area 86*k*. In addition, the position of the antenna 81*b* on the wireless communication substrate 81 is included in the second area 86*u*.

According to the above-described configuration, seen from the right and left direction of the image forming apparatus 1*c*, the position of the antenna. 81*b* on the wireless communication substrate 81 does not overlap with the position of the ground 86*c* of the sub-substrate 863, so that the radio waves transmitted and received from the antenna 81*b* are not inhibited by the ground 86*c*. Therefore, the wireless communication unit 80 can perform wireless communication by using the antenna 81*b*, without problem.

In addition, according to the above-described configuration, seen from the right and left direction of the image forming apparatus 1*c*, the position of the antenna 81*b* on the wireless communication substrate 81 is included in the area 85*f* in which the main substrate 85 is not present. For this reason, the radio waves transmitted and received from the antenna 81*b* on the wireless communication substrate 81 are not inhibited by a ground 85*d* of the main substrate 85. Therefore, the wireless communication unit 80 can perform wireless communication by using the antenna 81*b*, without problem.

Note that, the sub-substrate 863 is not necessarily provided with a part equivalent to the second area 86*u*. The sub-substrate 863 may also be a substrate consisting of only a part equivalent to the first area 86*k*.

As discussed above, the present disclosure may provide at least the following illustrative, non-limiting aspects.

A second illustrative aspect provides the wireless communication device according to the first illustrative aspect, in which the first connector may be provided on a first substrate surface of the sub-substrate, and in which the second connector may be provided on a second substrate surface of the sub-substrate.

In the above-described configuration, the first connector is provided on the first substrate surface of the sub-substrate, the second connector is provided on the second substrate surface of the sub-substrate, and the position of the first connector and the position of the second connector are shifted, when seen from the direction orthogonal to the substrate surface of the main substrate. Therefore, according to the above-described configuration, in the above-described configuration, the position of the antenna on the wireless communication substrate is shifted from the position of the antenna in the case where the two connectors are directly connected each other without passing through the sub-substrate.

A third illustrative aspect provides the wireless communication device according to the first illustrative aspect, in which the first connector and the second connector may be provided on a first substrate surface of the sub-substrate, and the second connector and the connector on the wireless communication substrate may be connected such that the wireless communication substrate does not overlap the main substrate, seen from the direction orthogonal to the substrate surface of the main substrate.

In the above-described configuration, the second connector and the connector on the wireless communication substrate are connected so that the wireless communication substrate does not overlap the main substrate, when seen from the direction orthogonal to the substrate surface of the main substrate. Therefore, according to the above-described configuration, it is possible to prevent the radio waves from transmission and reception of the antenna on the wireless communication substrate from being blocked by the main substrate.

A fourth illustrative aspect provides the wireless communication device according to the third illustrative aspect. in which the antenna may have an antenna pattern wired at an end portion in a length direction of the wireless communication substrate, along a width direction of the wireless communication substrate, and in which the second connector and the connector on the wireless communication substrate may be connected such that the length direction of the wireless communication substrate is parallel to a length direction of the main substrate.

In the above-described configuration, it is configured so that when seen from the direction orthogonal to the substrate surface of the main substrate, the wireless communication substrate does not overlap the main substrate and the length direction of the wireless communication substrate is parallel to the length direction of the main substrate. Therefore, according to the above-described configuration, the position of the antenna on the wireless communication substrate can be displaced by 90 degrees, as compared to the case where the connector on the main substrate and the connector on the wireless communication substrate are directly connected.

A fifth illustrative aspect provides the wireless communication device according to the third illustrative aspect, in which the antenna may have an antenna pattern wired at an end portion in a length direction of the wireless communication substrate, along a width direction of the wireless communication substrate, and in which the second connector and the connector on the wireless communication substrate may be connected such that the width direction of the wireless communication substrate is parallel to a length direction of the main substrate.

In the above-described configuration, it is configured so that when seen from the direction orthogonal to the substrate surface of the main substrate, the wireless communication substrate does not overlap the main substrate and the length direction of the wireless communication substrate is parallel to the length direction of the main substrate. Therefore, according to the above-described configuration, as for the position of the antenna on the wireless communication substrate, the main substrate can be displaced, as compared to the case where the connector on the main substrate and the connector on the wireless communication substrate are directly connected.

A sixth illustrative aspect provides the wireless communication device according to the second illustrative aspect, in which a position of the second connector may be a position deviating from a position of the first connector along a length direction of the main substrate, seen from the direction orthogonal to the substrate surface of the main substrate.

According to the above-described configuration, the position of the antenna on the wireless communication substrate can be shifted along the length direction of the main substrate, as compared to the case where the connector on the main substrate and the connector on the wireless communication substrate are directly connected.

A seventh illustrative aspect provides the wireless communication device according to the second illustrative aspect, further including a holder covering the sub-substrate and the wireless communication substrate except the first connector and holding an area of the sub-substrate, in which the area of the sub-substrate may overlap at least a place where the antenna is present, seen from the direction orthogonal to the substrate surface of the main substrate, and may be made of an insulating member.

A part of the substrate in the overlapping area of the sub-substrate, which is configured by the insulating member, is held by the holder, so that the wireless communication substrate and the sub-substrate can be appropriately supported by the holder.

A eighth illustrative aspect provides the wireless communication device according to the seventh illustrative aspect, in which the first connector may be provided on a first surface, the first surface being a surface other than the area of the first substrate surface of the sub-substrate, in which the second connector may be provided on a second surface, the second surface being a surface other than the area of the second substrate surface of the sub-substrate, in which a wiring pattern may be able to be arranged on the first surface and the second surface, the wiring pattern including: a first wiring pattern connected to the first connector and arranged on the first surface; and a second wiring pattern connected to the second connector and arranged on the second surface, and in which the first wiring pattern and the second wiring pattern are connected via a through-hole of the sub-substrate.

According to the above-described configuration, since the wiring patterns wired on the first surface and the second surface of the sub-substrate are connected via the through-hole, the main substrate and the wireless communication substrate can be connected through the first connector and the second connector. In addition, since the wiring patterns are arranged on the surfaces of the sub-substrate other than the area that overlaps a place where the antenna is present, an influence on wireless communication using the antenna can be suppressed.

A ninth illustrative aspect provides the wireless communication device according to the first illustrative aspect, in which a shape of the first connector on the sub-substrate may be a convex shape, in which a shape of the connector on the main substrate may be a concave shape, and in which the sub-substrate and the main substrate may be connected by fitting the first connector and the connector on the main substrate.

According to the above-described configuration, since the first connector on the sub-substrate and the connector on the main substrate are connectors having fitting-type shapes, it is possible to simply detach the main substrate and the wireless communication substrate.

According thereto, it is possible to implement the wireless communication device which can easily shift the position of the antenna.

The present disclosure is not limited to each of the above-mentioned illustrative embodiments and can be diversely changed within the scope defined in the claims, and illustrative embodiments implemented by appropriately combining the technical means disclosed in each of the different illustrative embodiments are also included in the technical scope of the present disclosure.

What is claimed is:

1. A wireless communication device comprising:
- a main substrate;
- a wireless communication substrate having an antenna configured to perform wireless communication;
- a sub-substrate having a first substrate surface and a second substrate surface opposite to the first substrate surface;
- a main connector provided on the main substrate;
- a communication connector provided on the wireless communication substrate;
- a first connector provided on the sub-substrate and being electrically connected to the main connector such that the sub-substrate is parallel to the main substrate; and
- a second connector provided on the sub-substrate and being electrically connected to the communication connector such that the sub-substrate is parallel to the main substrate,
- wherein a position of the first connector is a position shifted, in a length direction of the main substrate, from a position of the second connector, seen from a direction orthogonal to the first substrate surface of the sub-substrate.

2. The wireless communication device according to claim 1,
- wherein the first connector is provided on the first substrate surface of the sub-substrate and the second connector is provided on the second substrate surface of the sub-substrate.

3. The wireless communication device according to claim 1,
- wherein the first connector and the second connector are provided on the first substrate surface of the sub-substrate, and
- wherein the second connector and the communication connector are connected such that the wireless communication substrate does not overlap the main substrate, seen from the direction orthogonal to the first substrate surface of the sub-substrate.

4. The wireless communication device according to claim 3,
- wherein the antenna has an antenna pattern wired at an end portion in a length direction of the wireless communication substrate, along a width direction of the wireless communication substrate, and
- wherein the second connector and the communication connector are connected such that the length direction of the wireless communication substrate is parallel to a length direction of the main substrate.

5. The wireless communication device according to claim 3,
- wherein the antenna has an antenna pattern wired at an end portion in a length direction of the wireless communication substrate, along a width direction of the wireless communication substrate, and
- wherein the second connector and the communication connector are connected such that the width direction of the wireless communication substrate is parallel to a length direction of the main substrate.

6. The wireless communication device according to claim 2,
- wherein a position of the second connector is a position deviating from a position of the first connector along a length direction of the main substrate, seen from the direction orthogonal to the first substrate surface of the sub-substrate.

7. The wireless communication device according to claim 2, further comprising a holder covering the sub-substrate and the wireless communication substrate except the first connector and holding the sub-substrate,
- wherein the sub-substrate has:
  - a first area including a first insulating layer, a second insulating layer and a metal layer located between the first insulating layer and the second insulating layer; and
  - a second area including the first insulating layer, the second insulating layer and a third insulating layer located between the first insulating layer and the second insulating layer, and
- wherein the antenna of the wire communication substrate is located such that the antenna overlaps the second area of the sub-substrate and does not overlap the first area of the sub-substrate, seen from the direction orthogonal to the first substrate surface of the sub-substrate.

8. The wireless communication device according to claim 7,
- wherein the first connector and the second connector are provided in the first area of the sub-substrate,
- wherein the sub-substrate includes:
  - a first wiring pattern connected to the first connector and arranged on the first substrate surface of the first area; and
  - a second wiring pattern connected to the second connector and arranged on the second substrate surface of the first area,
- wherein the sub-substrate has a through-hole, and
- wherein the first wiring pattern and the second wiring pattern are connected via the through-hole of the sub-substrate.

9. The wireless communication device according to claim 1,
- wherein a shape of the first connector on the sub-substrate is a convex shape,
- wherein a shape of the main connector on the main substrate is a concave shape, and wherein the sub-substrate and the main substrate are connected by fitting the first connector and the main connector on the main substrate.

10. An image forming apparatus comprising:

an image forming unit;

a main substrate configured to control the image forming unit;

a wireless communication substrate having an antenna configured to perform wireless communication;

a sub-substrate having a first substrate surface and a second substrate surface opposite to the first substrate surface;

a main connector provided on the main substrate;

a communication connector provided on the wireless communication substrate;

a first connector provided on the sub-substrate and being electrically connected to the main connector such that the sub-substrate is parallel to the main substrate; and a second connector provided on the sub-substrate and being electrically connected to the communication connector such that the sub-substrate is parallel to the main substrate, wherein a position of the first connector is shifted from a position of the second connector, and a position of the antenna does not overlap with the main substrate, seen from a direction orthogonal to the first substrate surface of the sub-substrate, the direction being orthogonal to a surface of the antenna.

11. A wireless communication device comprising:

a main substrate;

a wireless communication substrate having an antenna configured to perform wireless communication;

a sub-substrate having a first substrate surface and a second substrate surface opposite to the first substrate surface;

a main connector provided on the main substrate;

a communication connector provided on the wireless communication substrate;

a first connector provided on the sub-substrate and being electrically connected to the main connector such that the sub-substrate is parallel to the main substrate; and a second connector provided on the sub-substrate and being electrically connected to the communication connector such that the sub-substrate is parallel to the main substrate, wherein a position of the first connector is a position shifted, in a length direction of the main substrate, from a position of the second connector, seen from a direction orthogonal to the first substrate surface of the sub-substrate;

wherein the first connector is provided on the first substrate surface of the sub-substrate and the second connector is provided on the second substrate surface of the sub-substrate; and the wireless communication device further comprising a holder covering the sub-substrate and the wireless communication substrate except the first connector and holding the sub-substrate, wherein the sub-substrate has:

a first area including a first insulating layer, a second insulating layer and a metal layer located between the first insulating layer and the second insulating layer; and a second area including the first insulating layer, the second insulating layer and a third insulating layer located between the first insulating layer and the second insulating layer, and wherein the antenna of the wire communication substrate is located such that the antenna overlaps the second area of the sub-substrate and does not overlap the first area of the sub-substrate, seen from the direction orthogonal to the first substrate surface of the sub-substrate.

* * * * *